United States Patent [19]

Groutage et al.

[11] 4,453,426
[45] Jun. 12, 1984

[54] PIVOTAL MONO WING CRUISE MISSILE WITH WING DEPLOYMENT AND FASTENER MECHANISM

[75] Inventors: Frederick D. Groutage, Laramie, Wyo.; Samuel N. Conjerti; Lockburn S. Shaw, both of San Diego, Calif.

[73] Assignee: The United States of America as represented by the Secretary of the Navy, Washington, D.C.

[21] Appl. No.: 372,870

[22] Filed: Apr. 29, 1982

Related U.S. Application Data

[62] Division of Ser. No. 182,335, Aug. 29, 1980.

[51] Int. Cl.³ .................... G05G 17/00; B64C 3/56
[52] U.S. Cl. .................................. 74/2; 74/577 S; 244/49
[58] Field of Search ............ 74/2, 577 S; 251/68, 251/69; 244/49

[56] References Cited

U.S. PATENT DOCUMENTS

| | | | |
|---|---|---|---|
| 291,970 | 1/1884 | Wright | 185/39 |
| 550,618 | 12/1895 | Howard | 74/2 X |
| 952,855 | 3/1910 | Wickes | 74/2 X |
| 1,514,946 | 11/1924 | Wood | 74/2 X |
| 3,130,590 | 4/1964 | Schleicher | 74/2 |
| 4,191,377 | 3/1980 | Burnside | 74/577 S |
| 4,220,050 | 9/1980 | Friesen et al. | 74/2 |

FOREIGN PATENT DOCUMENTS 44-20529 9/1969 Japan .................... 74/2

Primary Examiner—Allan D. Herrmann
Attorney, Agent, or Firm—R. F. Beers; E. F. Johnston; Harvey Fendelman

[57] ABSTRACT

A moveable wing aircraft including a quick release, attachment mechanism for carrying the aircraft on a bomb rack or other carrier and a mechanism for deploying the moveable wing from its captive carry position to its extended free flight position are disclosed. The aircraft includes an elongate fuselage, a portion of the top surface of which is substantially flat in order to accommodate the moveable wing. The moveable wing is positionable between a captive carry position in which it is aligned with the longitudinal axis of the fuselage and an extended free flight position. The single, moveable wing is pivoted around a central point from its captive carry position to its extended free flight position such that it is substantially perpendicular to the aircraft fuselage. The quick release mechanism extends through apertures in the wing in its captive carry position and is spring biased to retract through the wing and into the aircraft fuselage when released from the bomb rack or other carrier. The deployment mechanism includes a spring loaded cable and pulley arrangement and serves to connect the moveable wing to the fuselage and to bias it from its captive carry position to its extended free flight position when activated upon release of the quick release mechanism.

16 Claims, 7 Drawing Figures

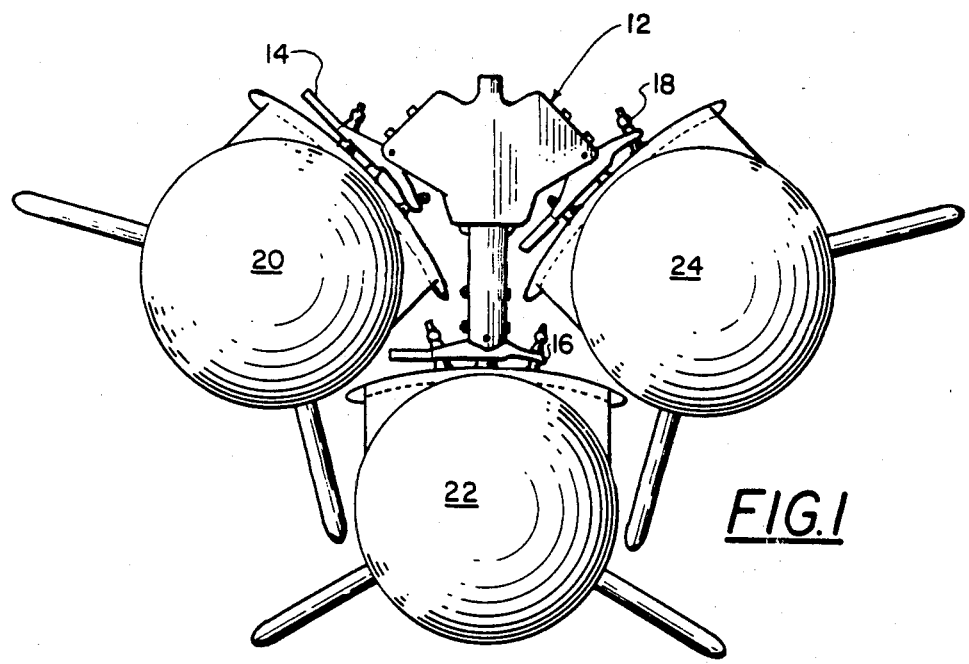
FIG.1
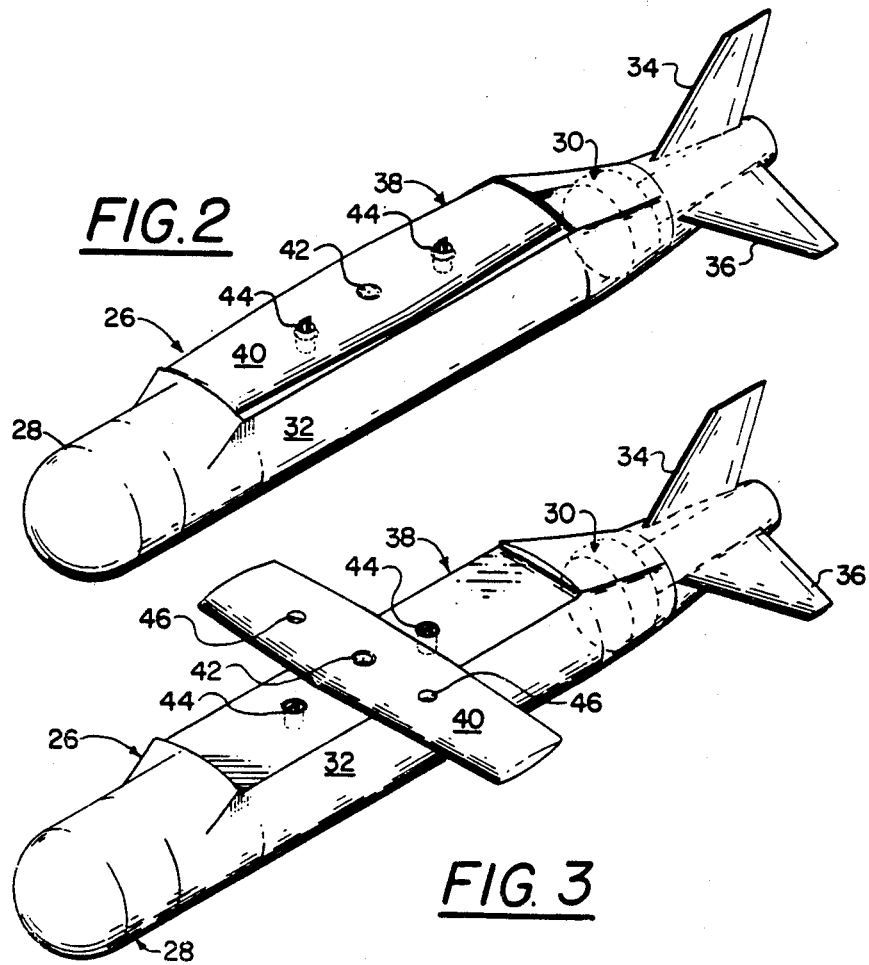
FIG.2
FIG.3

PIVOTAL MONO WING CRUISE MISSILE WITH WING DEPLOYMENT AND FASTENER MECHANISM

STATEMENT OF GOVERNMENT INTEREST

The invention described herein may be manufactured and used by or for the Government of the United States of America for governmental purposes without the payment of any royalties thereon or therefor.

This is a division of application Ser. No. 182,335, filed Aug. 29, 1980.

BACKGROUND OF THE INVENTION

The present invention relates generally to aircraft and more specifically to missiles that are borne aloft by and released from a carrier aircraft. Currently there are no air launch vehicles, i.e. cruise type aircraft with a turbojet engine, that can be carried and air launched as a 500 pound bomb. Prior art air launch vehicles have been disclosed but have been found to be unacceptable for various reasons. For instance, a swept wing design has been disclosed in the prior art in which two separate wings are positioned on top of the aircraft and are deployed when the aircraft is released from its carrier to a free flight position in which the wings are swept aft. This design suffers from the disadvantage that the wing cord dimension is approximately half of the fuselage width due to the fact that both separate wings must be stored adjacent each other on top of the vehicle. Other airborne missile designs such as that disclosed in U.S. Pat. No. 2,876,677 suffer from the inherent disadvantage of decreased packing density capability. Thus, an insufficient number of such airborne missiles can be carried by the carrier aircraft to render its mission effective.

SUMMARY OF THE INVENTION

The present invention relates to aircraft with a compactable, rotatable wing design. Also, the present invention relates to mechanisms for biasing a mechanical structure from one position such as a storage position towards another position such as a utility position. Further, the present invention relates to a quick release mechanism. More specifically, the present invention is concerned with a moveable wing aircraft, the mechanism for carrying the aircraft on a bomb rack attached to another aircraft and to a wing deployment mechanism for biasing the moveable wing from the captive carry position to the extended free flight position when activated following actuation of the quick release mechanism.

The aircraft and mechanizations of the present invention are particularly suitable for utilization in a cruise type missile where the missile is borne aloft and carried by a carrier aircraft. The design of the present invention achieves both maximum maneuverability of the missile as well as maximization of the packing density capability of the aircraft. The attachment mechanism of the present invention is of a retractable design such that during the captive carry position of the aircraft, the attachment mechanism extrudes from the fuselage body of the missile up through apertures in the wing structure. Following the release of the cruise missile from its bomb rack, the fastener mechanism retracts down through the pivotal wing into the fuselage. Once the fastener mechanisms have retracted into the fuselage, the wing deployment mechanism is activated which pivots the wing from its captive carry position in line with the fuselage to its extended free flight position perpendicular to the fuselage.

The missile fuselage itself is shaped to allow multiple loading on a bomb rack while optimizing the internal volume of the vehicle for maximum fuel and payload. The missile fuselage is designed with a recessed, flat upper surface which accommodates the pivoted wing during the carry position. The aircraft wing is a single wing configuration which pivots around a central pivot point, thereby achieving a large cord dimension. The increased cord dimension of the present design over prior art structures results in an aircraft that is much more maneuverable than prior designs.

OBJECTS OF THE INVENTION

Accordingly, it is the primary object of the present invention to disclose an aircraft having a single rotatable wing, a quick release mechanism for attachment to a carrier aircraft and a deployment mechanism for automatically rotating the single moveable wing around a pivot point from a storage position to a free flight extended position upon the release of the quick release mechanism to achieve a compact, carryable aircraft that is highly maneuverable.

It is another object of the present invention to disclose a novel aircraft having a rotatable wing that will automatically rotate from a position in line with the aircraft fuselage to an extended free flight position when the aircraft is released from its carrier.

It is a concomitant object of the present invention to disclose an aircraft that has a single relatively large cord wing that is rotatable from a storage position to an extended free flight position and which is not only highly maneuverable but also enables high density packing of more than one such aircraft.

It is another object of the present invention to disclose a quick release mechanism for attaching one mechanical device to another structure wherein the attachment mechanism automatically retracts into the mechanical device when released.

It is a still further object of the present invention to disclose a novel automatic quick release mechanism that accomplishes the foregoing object and also serves to prevent the actuation of another deployment mechanism until the quick release mechanism is fully retracted.

Another object of the present invention is to disclose a quick release mechanism that is highly stable, reliable and utilizes a minimum number of mechanical parts.

A still further object of the present invention is to disclose a simple automatic deployment mechanism for rotating an object from one position to another position when enabled, in a quick, efficient manner.

Another object of the present invention is to disclose a deployment mechanism in accordance with the foregoing object that requires only a minimum number of mechanical parts.

These and other objects of the invention will become more readily apparent from the ensuing specification when taken together with the accompanying drawings.

BRIEF DESCRIPTION OF THE DRAWINGS

FIG. 1 is an end view of a bomb rack showing the aircraft of the present invention in a three abreast loading arrangement.

FIG. 2 is an isometric view of the pivotal wing aircraft of the present invention with the moveable wing in the storage position.

FIG. 3 is an isometric view of the aircraft of the present invention illustrating the moveable wing in its extended free flight position.

DESCRIPTION OF THE PREFERRED EMBODIMENT

Figure 4:
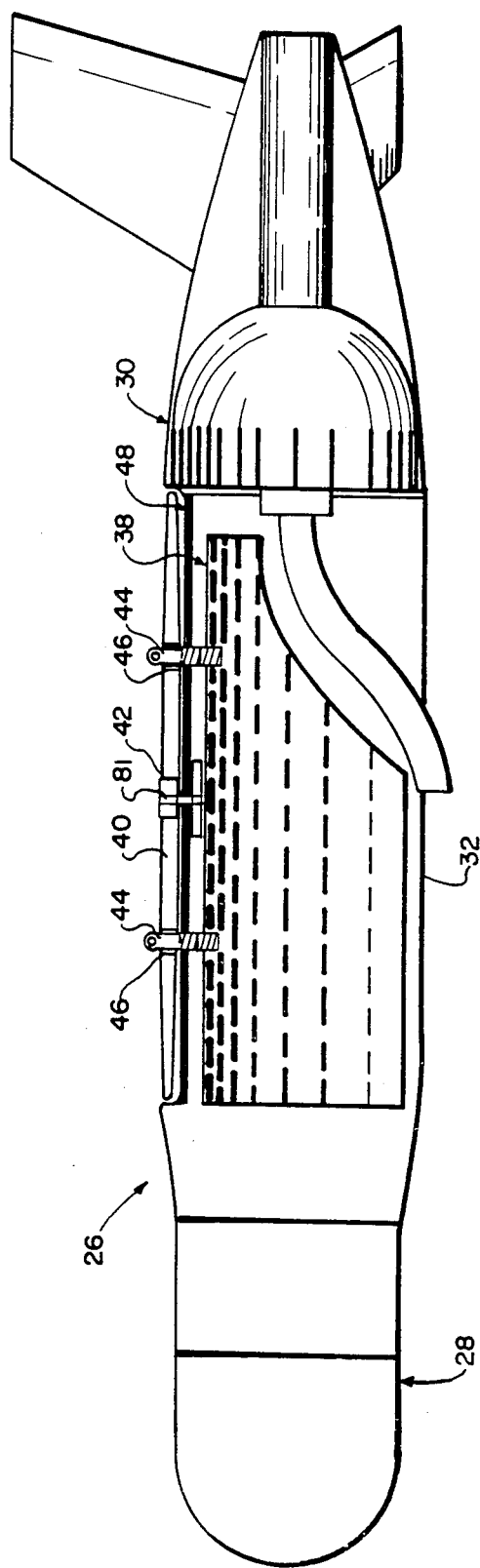
FIG. 4 is a cross section side view of the aircraft of the present invention with the moveable wing in the storage position.

Referring now to FIG. 1 there is illustrated a bomb rack 12 suitable for attaching the moveable wing aircraft of the present invention. The bomb rack 12 may be suspended from the wings of a mother aircraft as is well known and includes three carriage assemblies 14, 16 and 18 for carrying three cruise type missiles, bombs, or the like as is well known. As is apparent from FIG. 1 there is a limited amount of area within which to mount the cruise missiles 20, 22 and 24. Compactness of design of the cruise missile itself is therefore a critical requirement in achieving maximum packing density. It is noted that FIG. 1 is provided for illustrative purposes only so that the loading arrangement contemplated for the moveable wing aircraft of the present invention may be conceptualized.

Referring now to FIG. 2 there is illustrated the single, pivotal wing aircraft of the present invention with the pivotal wing thereof in the captive carry position. More particularly, the aircraft of the present invention comprises an elongate fuselage body 26 which has a payload area 28, and engine area 30 and a fuel area 32. The aircraft 26 also comprises a folding vertical tail 34 and stabilizers 36. The top of the elongate fuselage 26 is comprised of a flat surface 38 that is recessed into the fuselage 26. The single, pivotal wing 40 is secured to the top of the fuselage by the deployment mechanism 42 to be described in detail below. It is noted that the single pivotal wing 40 has a cord dimension that is substantially equal to the diameter of the fuselage of the aircraft 26 and that the wing 40 in its captive carry position as illustrated in FIG. 2 is positioned within the recess area 38 of the fuselage. Also illustrated in FIG. 2 is the pair of quick release mechanisms 44 which extend through apertures 46 in the wing 40 as is shown more clearly in FIG. 7 described below.

Referring to FIG. 3 the single pivotal wing aircraft of the present invention is illustrated in isometric view in its free flight extended position.

FIG. 4 is a partially cut away side view of the single, pivotal wing aircraft 26 of the present invention illustrating how the single pivotal wing 40 is positioned within the recessed area 48 immediately above the flat surface 38 at the top of the aircraft 26.

Figure 7:
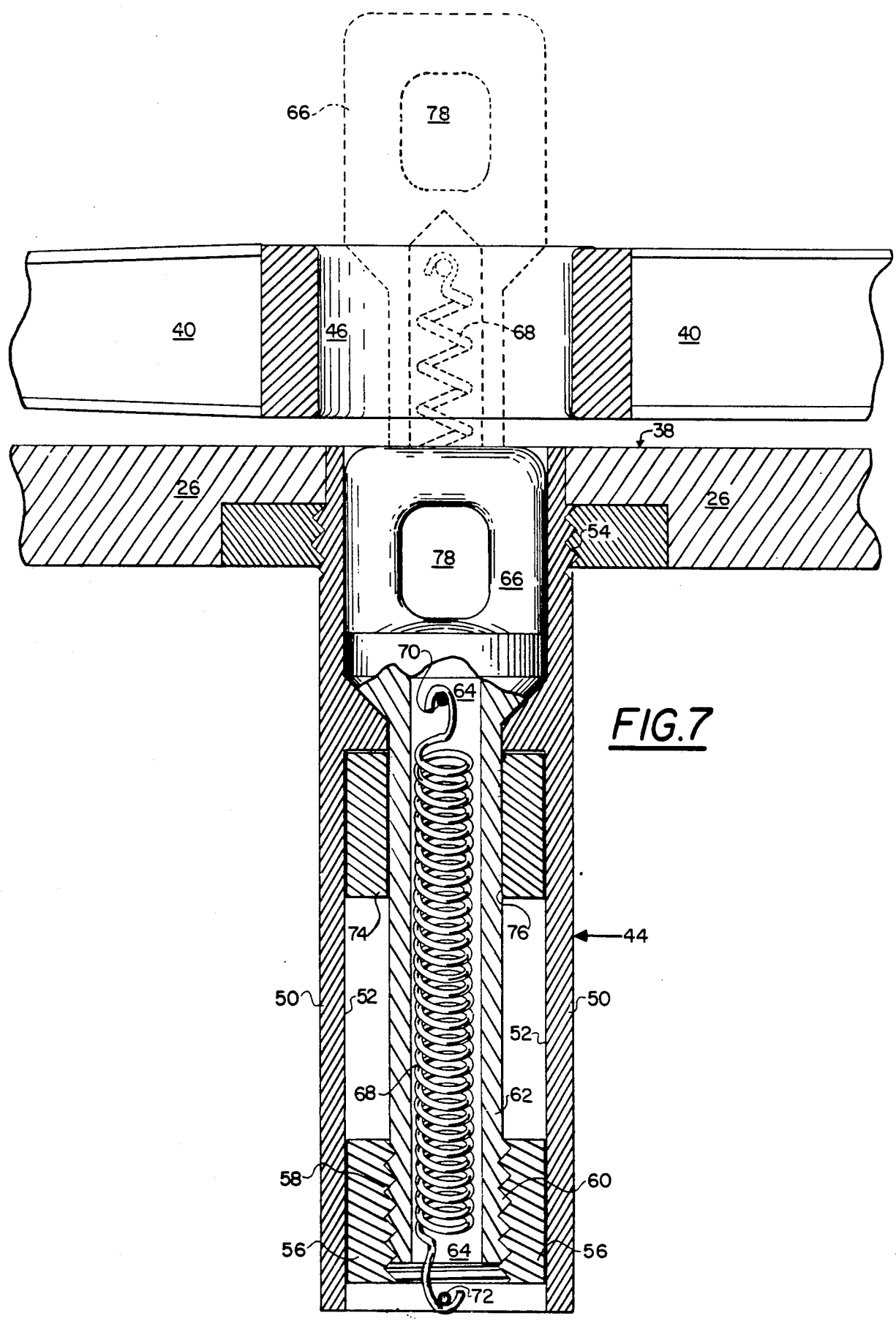
FIG. 7 is a cross section side view of the attachment mechanism of the present invention.

Referring now to FIG. 7 there is illustrated the quick release retractable attachment mechanisms 44 of the present invention. Preferably there are two such mechanisms as illustrated in FIGS. 1 through 4 and, since they are identical, only one is illustrated and described with respect to FIG. 7. The quick release attachment mechanism 44 is illustrated in FIG. 7 in both the extended and retracted positions, the extended position being illustrated in dotted lines. The attachment mechanism 44 is comprised of a housing 50 forming an interior cylinder wall 52. The housing 50 is provided with exterior threaded portions 54 for threading into and thereby securing the mechanism 44 to the aircraft fuselage body 26. Mounted within the cylindrical housing 50 and in slideable engagement with the cylinder walls 52 is the moveable piston 56. Piston 56 is free to slide up and down within the cylinder formed by cylinder walls 52. Piston 56 has a female threaded channel 58 formed in its center for mating engagement with the male threaded end 60 of connecting rod 62. Connecting rod 62 is thus threaded into engagement with the piston 56 and moves in conjunction therewith. Connecting rod 62 also has a hollow core 64 extending substantially along the length thereof and terminating at the eyelet end 66 of the connecting rod 62. A tension spring 68 is connected at one end to connecting pin 70 and extends through the core 64, through the channel bored in the piston 56 and is connected at its other end to connecting pin 72. Also mounted in secure fixed position within the cylinder walls formed by cylinder 52, at the top end of the cylinder, is a rigid annular support 74 which also has a hollow core 76 for permitting the passage of the connecting rod 62 therethrough and permitting the connecting rod 62 to slide therewithin. The rigid support 74 thus serves to stabilize the connecting rod 62 to prevent it from shifting in any direction normal to the longitudinal axis of the housing 50 and also serves to prevent the piston 56 from being pulled upwards and out of the housing 50. The eyelet end 66 of the connecting rod 62 has an opening 78 for receiving an actuating pin or the like.

In its fully extended position as illustrated in dotted lines in FIG. 7, the attachment mechanism 44 extends through the aperture 46 in the wing 40 and through the aircraft fuselage body 26. The attachment mechanism 44 is maintained in its fully extended position as illustrated in dotted lines in FIG. 7 by means of an actuating pin or the like (not shown) which would pass through the opening 78 in the eyelet end 66. In this fully extended position it is readily apparent that the bias spring 68 mechanically biases the eyelet end 66 of the connecting rod towards the bottom connecting pin 72 at the bottom of the housing 50. Activation of the actuating pin (not shown) as by solenoid action or other means as are well known, serves to release the connecting rod 62 under the bias of the spring 68 thereby retracting the connecting rod from its fully extended position down through the wing structure 40 and through fuselage 26. In this fully retracted position, the wing 40 is free to be deployed into its free flight extended position by pivoting of the wing 40 upon activation of and under the bias force of the deployment mechanization 42 to be described below.

Figure 5:
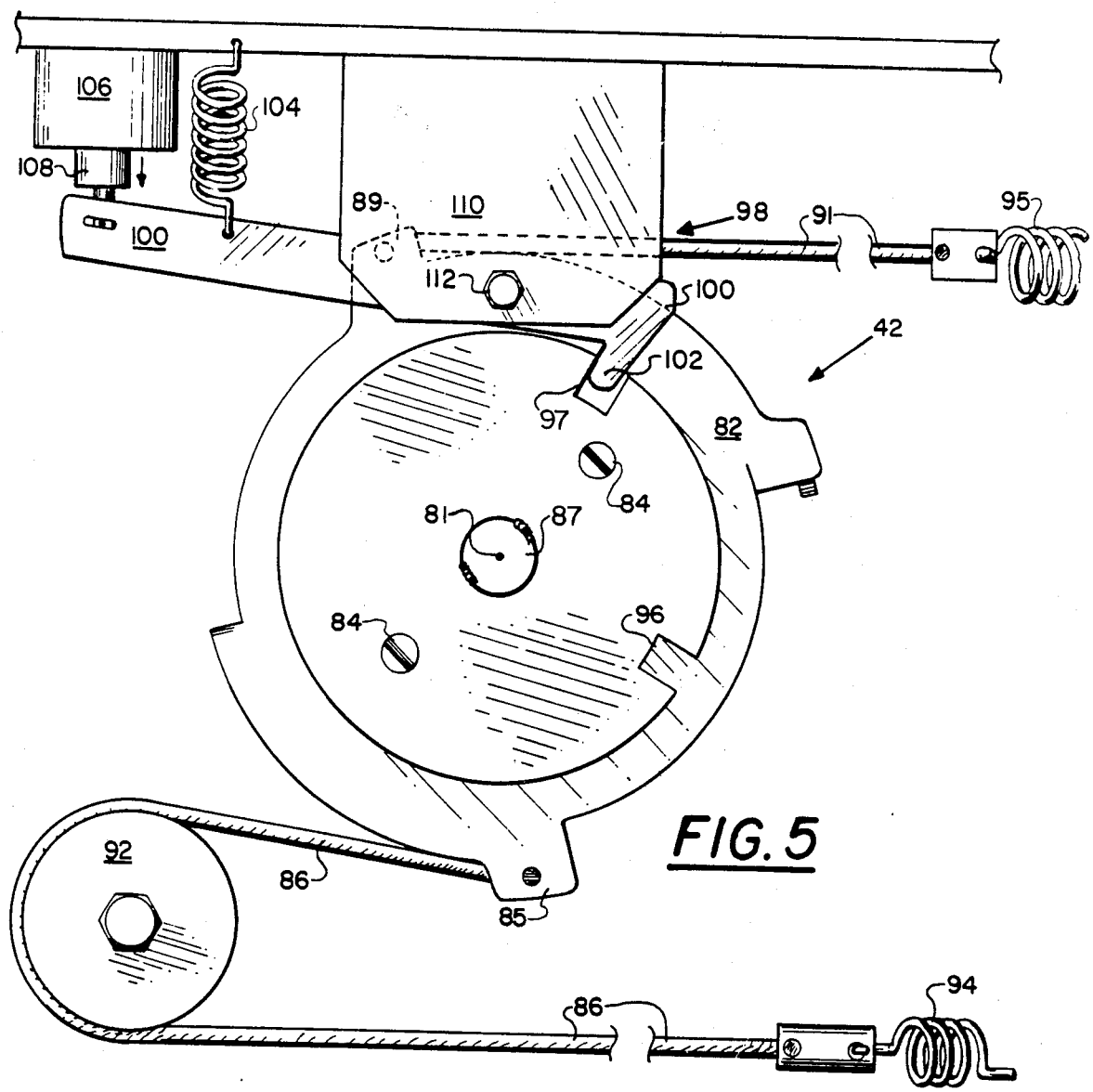
FIG. 5 is a bottom view of the deployment mechanism of the present invention.
Figure 6:
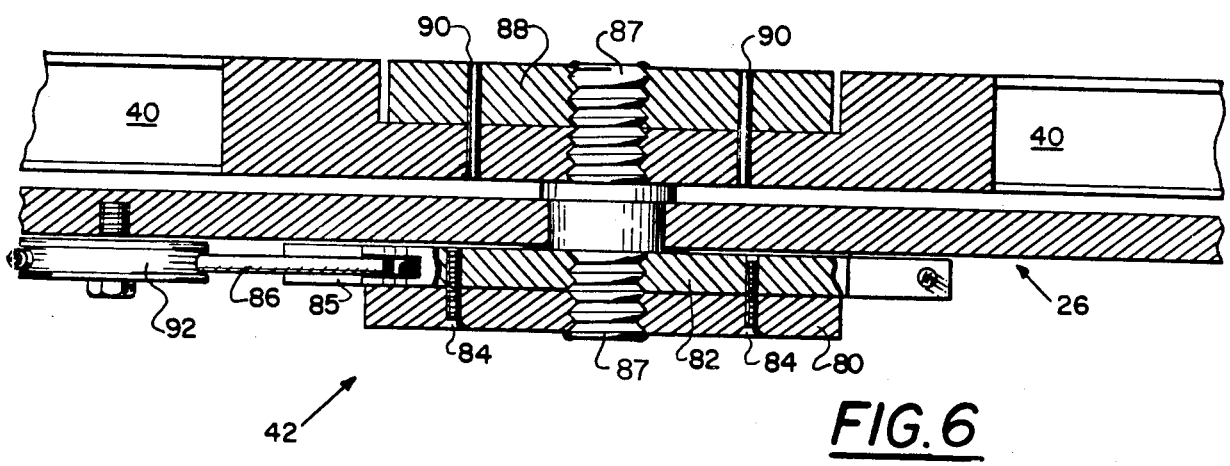
FIG. 6 is a cross section side view of the deployment mechanism of the present invention.

Referring now to FIGS. 5 and 6 there are illustrated, respectively, a bottom view and a cross section side view of the wing deployment mechanism 42 of the present invention. The wing deployment mechanism is a self-contained subassembly which rotates the wing about a pivot point 81 from the carriage position illustrated in FIG. 2 to the extended free flight position illustrated in FIG. 3. The wing deployment mechanism 42 is comprised of a generally disc shaped member 80 which is secured to a disc shaped flanged member 82 by connecting pins or rivets 84. Alternatively, the disc shaped members 80 and 82 may be formed as a unitary structure. Disc shaped flange member 82 has a connecting flange 85 for coupling to the cable 86 and a flange member 89 for coupling to the cable 91. The disc members 80 and 82 are securely fixed to connecting rod 87 which extends through the fuselage 26 of the aircraft for connection to the wing 40. A bracket 88 is securely fixed to the connecting rod 87 and also to the wing 40 by suitable means 90. It can thus be appreciated that bracket 88 and members 80 and 82 cooperate to secure the movable wing 40 in rotatable engagement with fuselage 26 and that fuselage 26 is stationary with respect to the rotation of wing 40. The connecting rod 87 is free to rotate within the body 26 of the missile and it is apparent that the wing 40 and disc members 80 and 82 will rotate in unison. Pulley 92 is rigidly connected to the missile fuselage 26 as illustrated in FIG. 6. Cable 86, which is connected to flange 85, extends around the pulley 92 and is connected at its other end to bias spring 94 which in turn is fixed to the missile body 26. Similarly cable 91 is connected to bias spring 95. Disc member 80 is provided with a first detent notch 97 for retaining the moveable wing 40 in its extended free flight position. A second notch 96 is provided in disc member 80 for retaining the moveable wing 40 in its captive carry position.

Trip mechanism 98 is comprised of trip lever 100 with latch member 102 which extends into either notch 94 or 96. Spring member 104 connected to the aircraft body and to trip lever 100 biases trip lever 100 such that latch member 102 enters either notch 94 or 96 when aligned with that notch. A solenoid 106 or other suitable actuating means is provided with an actuating rod 108 extending therefrom and in abutment with trip lever 100. Mounting bracket 110 is provided in order to secure the trip lever 100 at pivot point 112.

As seen in FIG. 5 the wing deployment actuating mechanism 42 is illustrated in the extended free flight position. In order to load the wing into the captive carry position such that the longitudinal axis of the wing 40 is aligned with the longitudinal axis of the fuselage 26, the wing deployment mechanism discs 80 and 82 would be rotated in a counterclockwise direction against the force of bias springs 94 and 95. This rotation may be accomplished by physically rotating the wing member 40 to its captive carry position. In this position, latch member 102 will enter notch 96 thereby retaining the wing 40 in the captive carry position. Once the attachment mechanisms 44 have been released and retracted through the apertures 46 in the wing 40, trip solenoid 106 is energized in order to extend the plunger 108 into contact with trip lever 100 thereby causing a counterclockwise rotation of trip lever 100 about pivot point 112. This action causes latch member 102 to withdraw from the notch 96 thereby permitting the cable 86 to pull flange 85 to the left as illustrated in FIG. 5 under the bias of spring 94 and also permitting the cable 91 to pull the flange 89 to the right under the bias of spring 95. It is noted at this point that actuating mechanism 106 is preferably of the type such that plunger 108 is automatically withdrawn or floats freely after being extended in order to permit the latch member 102 to enter the notch 94 as the disc members 80 and 82 rotate clockwise as described above.

It should thus be apparent at this point that once the single pivotal wing aircraft 26 of the present invention is released from the bomb rack or other carrier that the attachment mechanisms 44 will retract into the interior of the fuselage thereby permitting the deployment mechanism 42 to cause the wing 40 to pivot around the pivot point 80 and to swing out to the fully deployed free flight position.

Obviously, many modifications and variations of the present invention are possible in the light of the above teachings, and, it is therefore understood that within the scope of the disclosed inventive concept, the invention may be practiced otherwise than as specifically described.

What is claimed is:

1. A device for biasing a mechanical member from a first position to a second position comprising:
   an attachment bracket secured to said mechanical member and connected to a support member that is stationary with respect to said mechanical member;
   a pulley connected to said support member;
   a cable having a first end connected to said bracket and a second end, said cable being in slideable engagement with said pulley; and
   a spring having a first end connected to said support member and a second end connected to said cable second end for biasing said mechanical member towards said second position.

2. The device of claim 1 wherein:
   said attachment bracket comprises a disc shaped member having a connecting rod coupled thereto and extending perpendicularly therefrom and attached to said mechanical member and extending through said support member in rotatable engagement therewith.

3. The device of claim 2 further comprising:
   latch means having a latched and an unlatched position for preventing the movement of said disc shaped member when in said latched position.

4. The device of claim 3 wherein:
   said disc shaped member includes a first notch for receiving said latch means; and
   said latch means comprises a pivot rod actuable between latched and unlatched positions.

5. The device of claim 4 wherein:
   said disc shaped member includes a second notch for receiving said latch means.

6. The device of claim 5 comprising:
   a spring connected to said pivot rod for biasing said latch means towards said latched position.

7. The device of claim 3 wherein said latch means comprises:
   a solenoid attached to said support member, said solenoid including a free floating plunger;
   a trip lever attached to said support member, a portion of said trip lever being adjacent said free floating solenoid plunger so as to be contacted by said free floating plunger upon actuation thereof.

8. The device of claim 1 wherein:
   said attachment bracket and said pulley each have a center and each rotate about their respective centers in planes of rotation that are substantially coplanar.

9. The device of claim 1 wherein:
   said support member comprises the fuselage of an aircraft.

10. A device for biasing a mechanical member from a first position to a second position comprising:
    an attachment bracket secured to said mechanical member and for connection to a support member that is stationary with respect to said mechanical member, said attachment bracket further comprising a first disk shaped member having one side adjacent said support member and having a second side facing away from said support member and having a first radially extending flange, said cable first end being connected to said radially extending flange;

a pulley for connection to said support member;

a cable having a first end connected to said bracket and a second end, said cable being in slideable engagement with said pulley; and a spring having a first end connected to said support member and a second end connected to said cable second end for biasing said mechanical member towards said second position.

11. The device of claim 10 wherein said attachment bracket comprises:

a second disc shaped member fixed to said first disc shaped member having one side adjacent first disc shaped member second side.

12. The device of claim 11 wherein:

said first disc shaped member includes a second radially extending flange diametrically disposed on said first disc shaped member with respect to said first radially extending flange.

13. The device of claim 12 further comprising:

a second cable having a first end connected to said second radially extending flange and having a second end; and a second spring having a first end connected to said second cable second end and having a second end connected to said support member.

14. The device of claim 11 wherein said support member comprises the fuselage of an aircraft.

15. An apparatus for actuating a mechanical member from a first position to a second position with respect to a support member which includes a plate having a first side and a second side, the mechanical member being located on the first side of said plate, the apparatus comprising:

a curved bracket located on the second side of said plate;

a pin rotatably journalled through the plate and connected to said mechanical member and to said curved bracket;

said bracket having a pair of spaced apart notches along its curve;

spring means connected to said support and to said bracket for rotating said bracket with respect to said plate;

latch means pivotally mounted on said support and being spring biased for locking engagement into either of said pair of notches when aligned therewith; and means connected to said support for selectively withdrawing said latch means from at least one of said pair of bracket notches.

16. The apparatus of claim 15 wherein:

said withdrawing means comprises a solenoid having a free floating plunger.

* * * * *